May 30, 1939. H. A. BERLINER 2,160,258
METHOD OF SECURING NAILING STRIPS TO METAL BODIES
Filed June 11, 1934 3 Sheets-Sheet 1
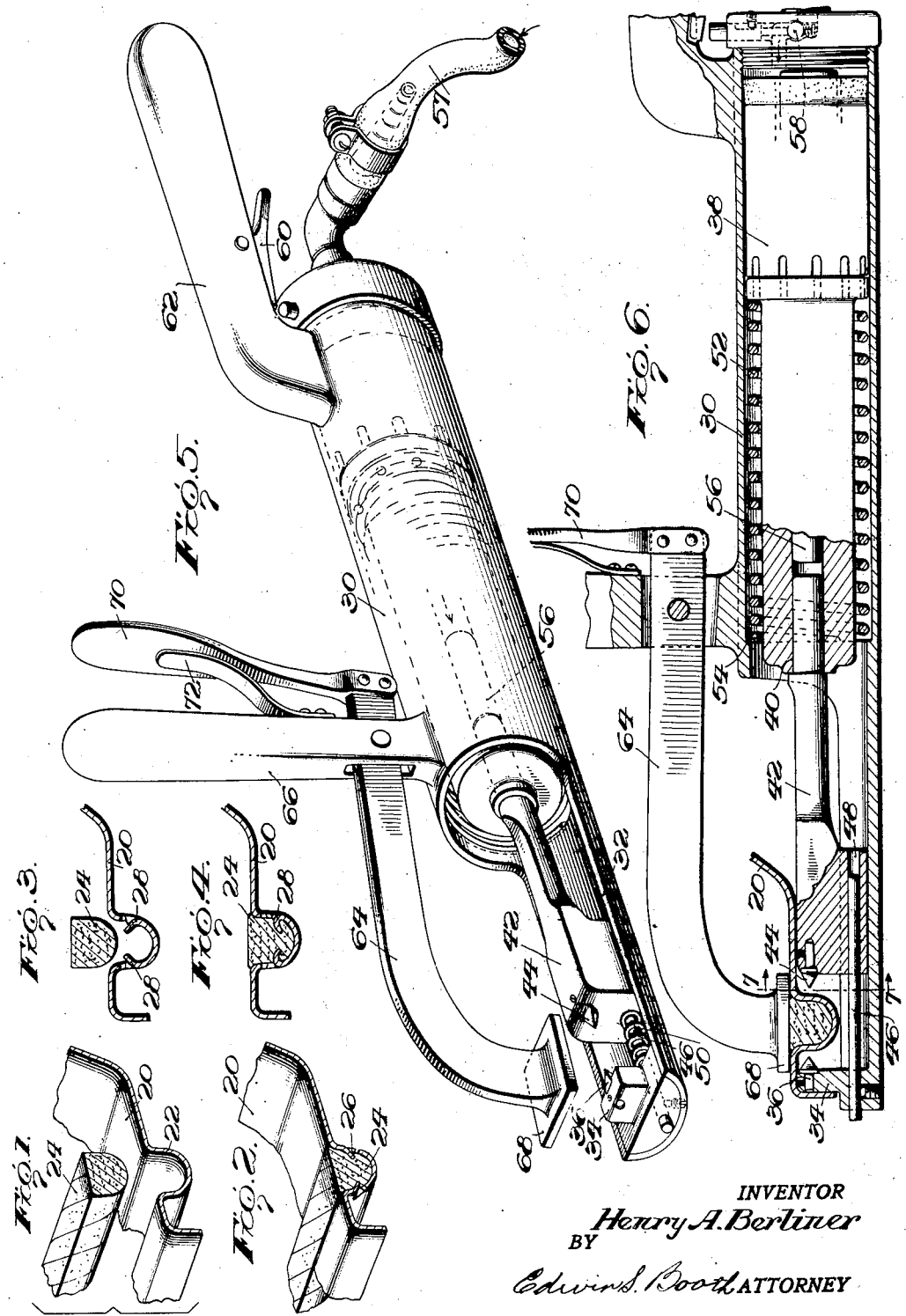
INVENTOR
Henry A. Berliner
BY
Edwin S. Booth ATTORNEY

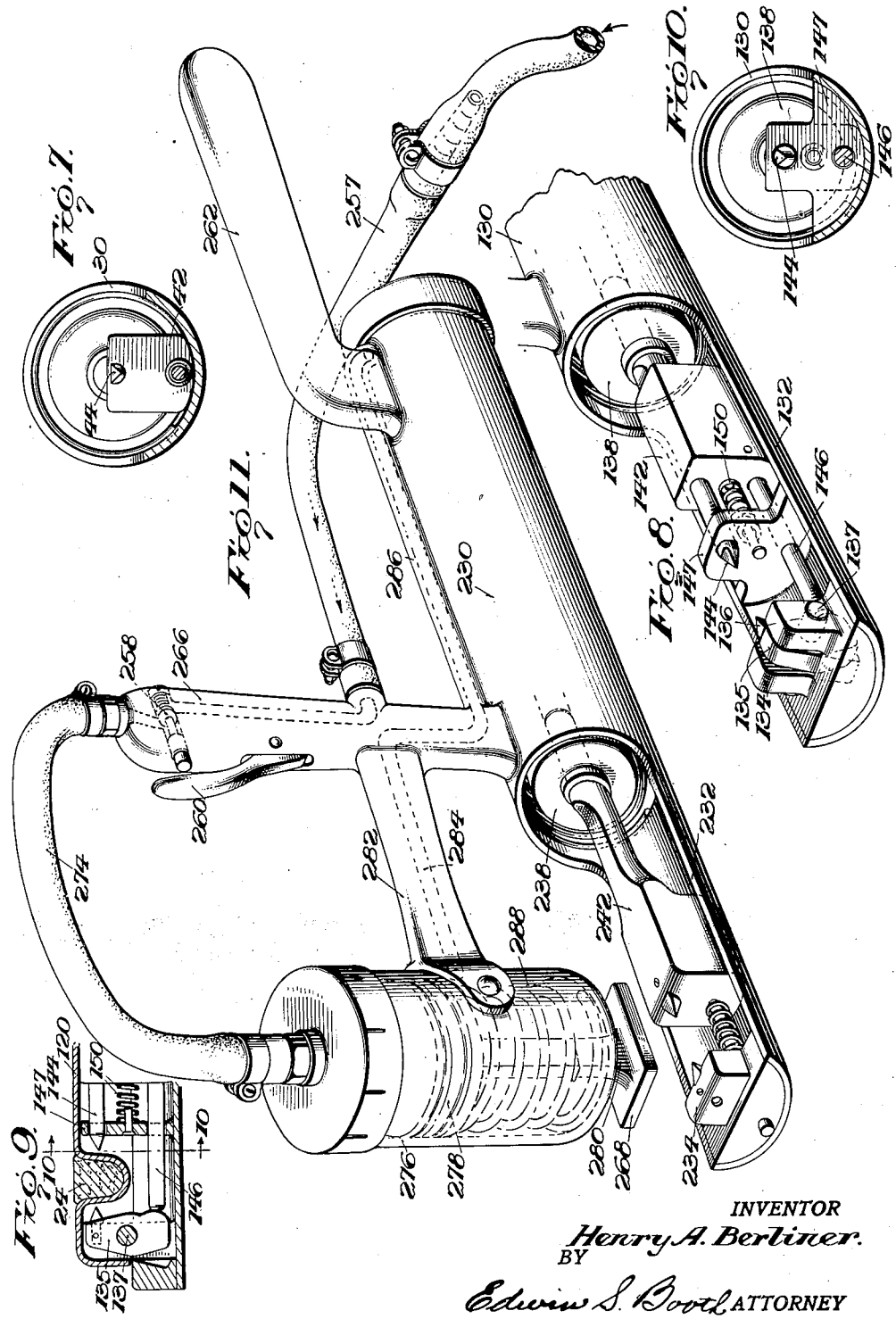

May 30, 1939.  H. A. BERLINER  2,160,258
METHOD OF SECURING NAILING STRIPS TO METAL BODIES
Filed June 11, 1934   3 Sheets-Sheet 3
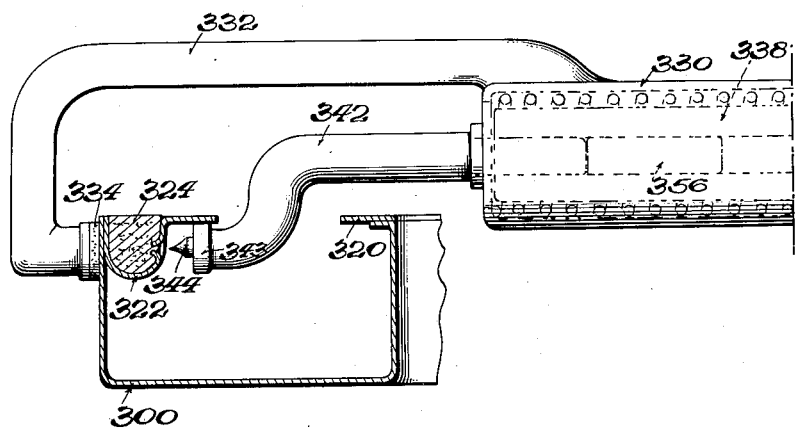
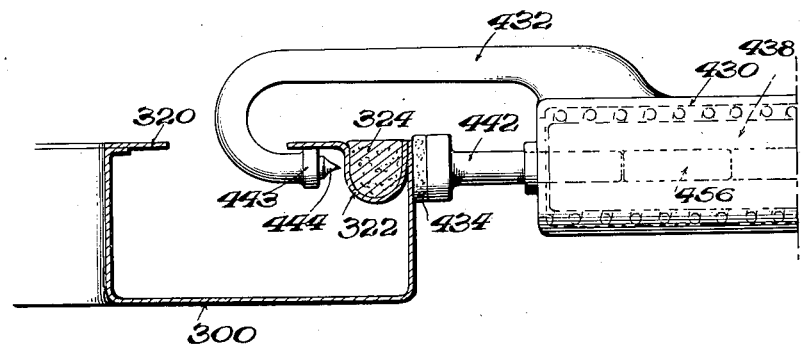
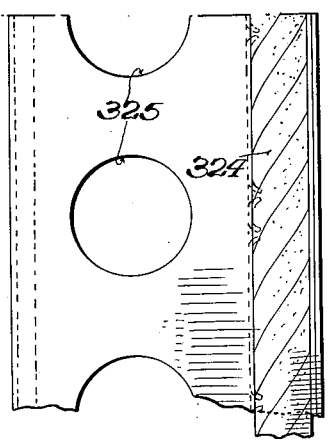
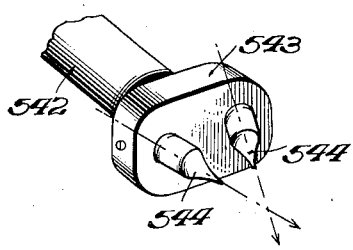
Inventor
Henry A. Berliner.
By Edwin S. Booth  Attorney Patented May 30, 1939

2,160,258

UNITED STATES PATENT OFFICE 2,160,258

METHOD OF SECURING NAILING STRIPS TO METAL BODIES

Henry A. Berliner, Washington, D. C., assignor, by mesne assignments, to Engineering and Research Corporation, Riverdale, Md., a corporation of Maryland Application June 11, 1934, Serial No. 730,164

4 Claims. (Cl. 153—1)

This invention relates to a method of securing nailing strips to metal and the article produced thereby and more particularly to a novel method of securing strips of relatively soft material adapted to receive a nail or screw or the like to sheet metal bodies and to the novel construction produced thereby.

Prior to the advent of metallic constructions wood was generally used, and fastenings such as nails or screws could be secured at substantially any desired point. However, in metal bodies it is essential to make some special provision whereby nails or the like can be used to secure other material thereto. For example, in automobile bodies or metal furniture it is desirable that a convenient means be provided whereby upholstery can be tacked on and a similar provision is desirable in metal house constructions to provide for the hanging of pictures and the like.

It has been proposed to secure strips of relatively soft material to the metal by driving nails through the material and into the metal construction, the strips in some instances being placed in grooves in the metal. This, however, is slow and expensive, requiring special nails adapted to be driven through metal, and is not entirely satisfactory since such nails are liable to come loose from the metal thereby releasing the strips.

According to the present invention strips of relatively soft material such as wood, braided or twisted paper or other suitable material, herein generically called nailing strips, are placed in grooves in the metal structure and are secured therein so that nails or screws can conveniently be driven into the strips for supporting upholstery or the like, the strips being secured in place by deforming the sides of the groove whereby the strip is permanently fastened in place without the use of nails or the like, and it is one of the objects of the invention to provide a novel article of manufacture constituted by a metal member having a groove therein in which is secured a suitable nailing strip. It is a further object of the invention to provide a novel article in which the strip is secured in the groove by indented portions in the sides of the groove, which may or may not be severed in part, and which press into the strip for retaining the same in place.

In the manufacture of articles of the type described above, and particularly where production in large quantities is contemplated, it is highly important that production costs be maintained at a minimum and to this end it is another object of the invention to provide an extremely simple and cheap method of securing nailing strips to metal. According to one feature of the invention this is accomplished by forcing a nailing strip into a groove in the metal and then indenting one side of the groove, the indentations preferably being in the form of integral punched-out tongues. In some instances it may be preferable to simultaneously indent opposite sides of the groove whereby the strip will be held on both sides and it is another object of the invention to provide a novel method of securing nailing strips in which the strip is first forced into a groove and both sides of the groove are simultaneously indented.

According to another feature of the novel method contemplated by the invention integral tongues may first be formed in the sides of a groove in a metal member and a nailing strip then forced into the groove whereby the tongues will penetrate the strip and hold it in place and it is another object of the invention to secure nailing strips according to this novel method.

Applicant has discovered that indentations or integral tongues can be formed in or punched-out of metal with the use of much less power if a point is placed against the metal and struck a rapid series of blows to cause it to vibrate rapidly. It is accordingly another object of the invention to secure a nailing strip in a groove in a metal member by forcing the strip into the groove, placing a point against the side of the groove and rapidly vibrating the point.

Other and further objects and novel features of the invention will be apparent from the following specification when taken in connection with the accompanying drawings. It is to be understood, however, that the drawings are for the purpose of illustration only and are not to be taken as a definition of the limits of the invention, reference being had for this purpose to the appended claims.

In the drawings wherein like reference numerals indicate like parts throughout the several views:

Figs. 1 and 2 illustrate one embodiment of the invention as applied to sheet metal strips;

Figs. 3 and 4 are sectional views illustrating another embodiment of the invention;

Fig. 5 is a perspective view of one form of apparatus embodying the invention;

Fig. 6 is a side view of the embodiment shown in Fig. 5 with parts in section;

Fig. 7 is a partial sectional view substantially on the line 7—7 of Fig. 6;

Fig. 8 is a partial perspective view similar to Fig. 5 and showing another embodiment of the invention;

Fig. 9 is a central sectional view of the embodiment shown in Fig. 8;

Fig. 10 is a partial section substantially on the line 10—10 of Fig. 9;

Fig. 11 is a view similar to Fig. 5 and showing another embodiment of the invention;

Figs. 12 and 13 are side views showing still another embodiment of the invention;

Fig. 14 is a partial view showing a structure illustrating an application of the invention; and Fig. 15 is a perspective view showing a detail.

Referring to the drawings and more particularly to Figs. 1 to 4 thereof, there is shown an embodiment of the invention as applied to sheet metal automobile body constructions constituted by a sheet metal member 20 having a generally U-shaped elongated groove 22 formed therein which is adapted to receive a nailing strip 24. The nailing strip is shown in this case as formed of braided or twisted paper though it will be obvious that it may be formed of wood, composition or any other suitable material for receiving nails or screws. The member 20 is adapted, in an automobile construction, to extend around the interior of the body and the nailing strip 24 provides a suitable place to which upholstery can conveniently be attached by means of nails or the like.

In order to permanently secure the nailing strip in the groove 22, the sides of the groove are indented as shown at 26 (Fig. 2). Such indentations may take the form of dents in the side of the groove pressing against or into the nailing strip but preferably the metal is actually severed to form punched out tongues which penetrate the strip 24 and permanently secure the same in place in the groove, as shown in Fig. 2.

The indentations are preferably formed by first forcing the nailing strip 24 into the groove 22 and then indenting the side of the groove to secure it in place. It may be sufficient to form the indentations or punched out tongues in one side only of the groove, but preferably such indentations are simultaneously formed in opposite sides of the groove so that the strip is supported on both sides thereof.

The nailing strip can, however, be secured by first punching out integral tongues in the sides of the groove as best shown in Figs. 3 and 4. In this modification integral tongues 28 are first punched out of the sides of the groove and the nailing strip 24 is then forced into the groove thus forcing the tongues 28 into the strip and bending the same over as the strip is forced in, so that the parts assume a position such as that shown in Fig. 4 whereby the strip is securely fastened in the groove.

Referring now to Figs. 5, 6 and 7, there is shown therein one form of apparatus for manufacturing applicant's novel article by the novel method described above. Such apparatus as shown is constituted by a cylindrical casing 30 having an extension 32 at one end thereof to the end of which is rigidly secured a supporting member 34 supporting a point 36. This point is preferably single as shown but it may, if desired, be double or triple whereby a plurality of indentations will be formed simultaneously. In the cylinder 30 is mounted a piston 38 having an axial bore 40 therein, in the end of which is inserted one end of a member 42. The member 42 carries at its opposite end a point 44 similar to and aligned with the point 36 and a rod 46 secured to the support 34 in any suitable manner extends through a bore 48 in member 42 to maintain the points in alignment. It will be understood that when the point 36 is double or triple the point 46 will also be double or triple, the opposite points being aligned. A coil spring 50 preferably surrounds the rod 46 and abuts against the members 34 and 42 to urge the same apart and a second coil spring 52 is situated in the cylinder 30 between a shoulder 54 formed therein and an enlarged portion of the piston 38 to urge the piston to the right as seen in Fig. 2.

The piston 38 may be of any desired type but it is preferably provided with a small hammer member 56 sliding in the bore 40 therein and with suitable valve mechanism for admitting pressure first to one side and then the other of the hammer member whereby the same is rapidly oscillated back and forth in the bore to strike the member 42 a rapid series of relatively light blows. This produces a rapidly pulsating forward motion of the point and has been termed herein a "vibration". Such valve mechanism per se does not form any part of the present invention and has therefore not been shown in detail herein but it may take the form of the mechanism shown in the patent to Boyer No. 575,589 or any other suitable form for causing rapid oscillations or vibrations of the hammer member. In the operation of this piston construction, fluid under pressure is admitted into the cylinder through a line or conduit 57 past a suitable valve 58 controlled by a trigger 60 pivoted on a suitable handle 62 which is rigidly secured to the cylinder 30. The piston 38 slides forwardly in the cylinder until point 44 contacts one side of groove 22 which offers resistance to further motion and causes pressure to be built up behind the piston. When a predetermined fluid pressure has been built up the hammer 56 starts oscillating and strikes the member 42 a rapid series of blows to force the point 44 into the side of the groove to produce an indentation therein. The point 36 is simultaneously forced into the opposite side of the groove so that diametrically opposite indentations are formed in the groove, though if desired the point 36 may be omitted and only one side of the groove indented.

Where relatively shallow indentations are sufficient to hold the strip in place or where very little clearance is necessary, the cylinder 30 may be omitted and extension 32 may be secured directly to the piston 38. In this case the only forward motion of member 42 is due to its being struck by the hammer member 56 which starts oscillating in the bore 40 as soon as fluid pressure is admitted.

In order to hold the nailing strip in place in the groove while the indentations are being formed, a lever 64 is provided pivoted to a handle member 66 which is rigidly secured to the cylinder 30. The lever 64 carries at its outer end a plate or the like 68 having a substantially flat lower surface and at its other end is provided with a rigid handle 70 extending substantially parallel to the handle 66, both of said handles being adapted to be simultaneously gripped in the hand of the operator to press the plate 68 downwardly. A suitable spring 72 is provided urging the handles apart and tending to raise the plate 68.

In operation of the apparatus so far described the nailing strip is first forced into the groove 22 and the strip 20 is then placed in the position shown in Fig. 2 with the flat portions thereof resting on the upper surfaces of members 34 and 42, though if desired the metal member may be first placed in the apparatus and the nailing strip then forced into the groove by means of the lever 64 and plate 68. With the parts in the position shown in Fig. 2 it will be noted that the points 36 and 44 engage the sides of groove 22 the same distance below the top thereof as such points are located below the upper surfaces of members 34 and 42 and this is an important feature since it assures that the indentations in the sides of the groove are always formed at such distance below the top of the groove as to provide maximum holding effect for the nailing strip. With the metal member in position the operator grips handles 66 and 70 with one hand thereby pressing plate 68 against the top of the nailing strip and metal member to hold the strip in place in the groove and with his other hand operates trigger 60 to admit air pressure to the cylinder. The piston 38 is moved forwardly or to the left as seen in Fig. 5 by the fluid pressure until point 44 contacts the side of the groove and the hammer 56 then vibrates member 42 forcing points 44 and 36 into the sides of the groove to produce indentations therein.

Applicant has discovered that during this operation there is a tendency for the point 44, which is connected to the piston, to penetrate further into the side of the groove than the stationary point 36 and in order to correct for this tendency the member 42 is provided with a relatively broad flat face at its forward portion adapted to engage the side of the groove after point 44 has penetrated a predetermined distance fixed by the length thereof. After the face of member 42 engages the side of the groove any additional movement must be due to further penetration of fixed point 36. Application of power is continued until the points have penetrated the sides of the groove to the desired extent, when trigger 60 is released allowing springs 50 and 52 to withdraw the points 36 and 44 and the metal member to be removed from the apparatus. This operation is repeated at periodic intervals along the length of groove 22 whereby the nailing strip is secured in the groove throughout its length.

Referring now to Figs. 8, 9 and 10 there is shown another embodiment of the invention in which two points on opposite sides of the groove are simultaneously moved by a single power means, the parts in these figures corresponding to similar parts in the preceding figures being indicated by the same reference numerals plus 100. In this modification the support 134 is constituted by two spaced members which pivotally support between them a rocking member 135 on a pivot pin 137. The rocking member carries at its upper part a point 136 and at its lower part is adapted to be engaged by a rod 146 carried by the member 142. Point 144 and rod 146, both carried by member 142, pass through openings in a plate 147 which is rigidly secured to the extension 132 to guide member 142 and a suitable coil spring 150 is provided acting between the plate 147 and member 142 to urge member 142 rearwardly.

In the operation of this embodiment as member 142 is moved forwardly by the piston, the rod 146 engages the lower end of rocking member 135 thus rocking this member about the pivot 137 and moving point 136 inwardly toward point 144 simultaneously as this latter point is moved outwardly. Of course vibrations of member 142 are simultaneously transmitted to both points 136 and 144 so that these points will simultaneously be forced into opposite sides of the groove in the metal member to form indentations therein. It will be noted particularly from Fig. 9 that the upper surfaces of members 134 and 147 form supports for the metal member in the same manner as members 34 and 42 in Figs. 5 to 7 and that the indentations will be formed in the sides of the groove the same distance below the top thereof as points 136 and 144 are located below the upper surfaces of members 134 and 147.

Referring now to Fig. 11 there is shown therein still another embodiment of the invention in which power means are provided for forcing and/or holding the nailing strip in the groove, parts in this figure corresponding to similar parts in Figs. 5 to 7 being indicated by the same reference numerals plus 200. In this embodiment the fluid pressure line 257 leads into the handle 266, the latter being provided with a suitable passage therethrough closed by a valve 258 which is controlled by a trigger 260. This passage is connected by a suitable conduit 274 with the upper part of a cylinder 276, there being a piston 278 in the cylinder having a piston rod 280 which carries at its lower end a plate 268. The cylinder 276 is supported by a rigid arm 282 secured to the handle 266, this arm being provided with a fluid passage 284 which communicates with the cylinder at substantially the central portion thereof and which leads through a suitable conduit 286 into the rearward portion of the cylinder 230. A coil spring 288 is preferably provided tending to raise the piston 278 in the cylinder 276.

In the operation of this modification the trigger 260 is operated to admit fluid under pressure to the top of cylinder 276 thus forcing piston 278 down. When piston 278 passes the opening of passage 284 fluid flows through this passage into the rear part of cylinder 230 to operate piston 238 in the manner described above. It will be understood that the construction shown in Fig. 11 can be employed in connection with the points as described in either Figs. 5 to 7 or Figs. 8 to 10 and that the nailing strip can first be forced into the groove in the metal member or the metal member can first be placed in the apparatus and the nailing strip forced into the groove therein by the piston 278. It will be noted that no pressure fluid is admitted to operate the piston 238 until piston 278 has been moved downwardly thus insuring that the nailing strip is in place in the groove before the sides of the groove are indented. If desired a plurality of valves may be employed for separately controlling operation of the pistons 278 and 238, such valves either being successively operated by a single operating member or provided with entirely separate and independent operating members.

Figs. 12 and 13 show another embodiment of the invention adapted to be employed in places wherein both sides of the groove are not readily accessible, such, for example, as the door post of an automobile body. Such a post is shown in elevation in Fig. 14 and in section in Figs. 12 and 13 as constituted by an outer plate member 300 bent into substantially a U shape with the open side of the section closed by a plate 320 formed integral with the plate 300 or secured thereto in any suitable manner as by welding. The plate 320 is provided with a groove 322 adapted to receive a nailing strip 324, one side of the groove lying against and being welded or otherwise secured to the plate 300, and is further provided with a series of holes 325.

As shown in Fig. 12 the apparatus is constituted by a cylinder 330 provided with a rigid extension 332 having a facing of lead, leather or other suitable material shown at 334 and adapted to bear against the side of member 300 to which the groove 322 is secured. A suitable piston 338 is mounted in the cylinder 330 and supports a member 342 having a head portion 343 to which a point or points 344 are secured. The piston 338 is preferably of the same type as 38 in Figs. 5 and 6 and is provided with a hammer member 356 adapted to strike member 342 a series of rapid blows.

In operation of this embodiment the member 342 is inserted through one of the holes 325 and member 332 is situated with the facing 334 bearing against the side of plate 300 as shown in Fig. 12. The member 342 is then raised until the upper surface of head portion 343 strikes plate 320, it being noted that points 344 are so located with respect to this surface that they contact the side of the groove the predetermined correct distance below the top thereof. Fluid under pressure is then applied to piston 338 to force the point 344 into contact with the side of the groove, the point being held against the side of the groove by fluid pressure and simultaneously vibrated whereby it is forced into the side of the groove to indent the same whereby the nailing strip is securely held therein. It will be noted that during this operation the fluid pressure tends to draw the points 344 and member 332 together so that the groove is gripped there between and the points are forced into the side of the groove. If desired the extension 332 and cylinder 330 may be omitted, the piston 338 in this case being provided with a suitable handle, not shown, and points 344 being held manually against the side of the groove and vibrated by hammer member 456.

Fig. 13 illustrates a modification of the apparatus of Fig. 12, similar parts being indicated by the same reference numerals plus 100. In this modification head member 443 and points 444 are carried by the rigid extension 432 and member 442 is provided with a facing 434. Actuation of the piston 438 in this case will force points 444 into the side of the groove, the force being applied to the points by reaction rather than by direct action as in Fig. 12.

Referring now to Fig. 15, there is shown therein a modified form of points which is preferably employed in connection with the embodiments shown in Figs. 12 and 13 though it is equally applicable with the other embodiments. As shown this form is constituted by a shaft portion 542 having thereon a head member 543 in which are mounted a pair of point members 544. These points are preferably mounted with their axes converging outwardly and with their inner portions substantially parallel so that as they are forced into or through the metal the metal is spread outwardly away from the points.

From the above it will be seen that there is provided by the present invention a novel article constituted by a metal member having grooves therein with suitable nailing strips permanently and securely fastened in the grooves, the nailing strips being secured in the grooves by a novel method which eliminates the necessity for nails or like securing members and which can be performed much more easily, quickly and cheaply than the methods heretofore known. There is also provided a novel apparatus for carrying out this method, such apparatus including novel means for indenting one or both sides of the groove in the metal member to secure the nailing strip therein, provision also being made for correctly spacing the indentations from the top of the groove and for holding the strip in the groove while it is being secured therein, such holding means, if desired, also serving to force the nailing strip into the groove.

While several embodiments of the invention have been shown and described it will be apparent to those skilled in the art that the same might be embodied in various other forms or practiced by other methods without departing from the scope thereof. Reference will therefore be had to the appended claims for a definition of the limits of the invention.

What is claimed is:

1. That method of securing nailing strips to sheet metal which comprises forcing a nailing strip into a groove in a sheet metal member, placing a point against the side of the groove, and rapidly vibrating the point to form an indentation in the side of the groove pressing into the side of the strip.

2. That method of securing a nailing strip in a groove in a sheet metal member which comprises forcing a nailing strip into the groove, pressing a pair of opposed points against opposite sides of the groove and vibrating one of the points to form indentations in the sides of the groove pressing into the sides of the strip.

3. That method of securing a nailing strip in a groove in a sheet metal body having a substantial extension laterally from the top of the groove which comprises forcing a nailing strip into the groove with its outer surface substantially flush with the surface of said extension, employing said extension as a gaging means and indenting the side of the groove a predetermined distance below the lower surface of the extension to form an integral raised portion pressed into the side of the strip to secure the strip in the groove.

4. That method of securing a nailing strip in a groove in a sheet metal body having a substantial extension laterally from the top of the groove which comprises forcing a nailing strip into the groove with its outer surface substantially flush with the surface of said extension, placing a pair of points on the opposite sides of said groove, employing said extension as a gaging means to predetermine the distance of said points below the lower surface of the extension and simultaneously pressing the points into the sides of the groove to form diametrically opposite integral raised portions pressed into the sides of the strip to secure the strip in the groove.

HENRY A. BERLINER.